US007722459B2

(12) United States Patent
Kane et al.

(10) Patent No.: US 7,722,459 B2
(45) Date of Patent: May 25, 2010

(54) SYSTEM AND METHOD FOR PERFORMING BET PROTECTION

(75) Inventors: Steven N. Kane, Brookline, MA (US); Stuart Roseman, Boston, MA (US); Jason Yanowitz, Amherst, MA (US); Mark E. Herrmann, Wellesley, MA (US)

(73) Assignee: GameLogic Inc., Waltham, MA (US)

( * ) Notice: Subject to any disclaimer, the term of this patent is extended or adjusted under 35 U.S.C. 154(b) by 0 days.

(21) Appl. No.: 11/073,940

(22) Filed: Mar. 7, 2005

(65) Prior Publication Data

US 2005/0227756 A1 Oct. 13, 2005

Related U.S. Application Data

(60) Provisional application No. 60/550,779, filed on Mar. 5, 2004.

(51) Int. Cl.
*G06F 17/00* (2006.01)
*G06F 19/00* (2006.01)

(52) U.S. Cl. .............................. 463/25; 463/1; 463/16; 463/20; 463/26; 463/27; 463/28; 463/42; 273/274; 273/292

(58) Field of Classification Search ............. 463/25-28, 463/1, 16, 20, 42; 273/292, 274
See application file for complete search history.

(56) References Cited

U.S. PATENT DOCUMENTS

| | | | | |
|---|---|---|---|---|
| 4,339,134 | A * | 7/1982 | Macheel | 463/12 |
| 5,390,934 | A * | 2/1995 | Grassa | 273/292 |
| 5,766,075 | A * | 6/1998 | Cook et al. | 463/25 |
| 5,910,048 | A * | 6/1999 | Feinberg | 463/25 |
| 6,077,163 | A * | 6/2000 | Walker et al. | 463/26 |
| 6,113,493 | A * | 9/2000 | Walker et al. | 463/25 |
| 6,319,127 | B1 * | 11/2001 | Walker et al. | 463/26 |
| 6,354,592 | B1 * | 3/2002 | Virzi | 273/138.1 |
| 6,540,230 | B1 * | 4/2003 | Walker et al. | 273/292 |
| 7,140,964 | B2 * | 11/2006 | Walker et al. | 463/25 |
| 2001/0012797 | A1 | 8/2001 | Walker | |
| 2003/0052452 | A1 * | 3/2003 | Spur et al. | 273/292 |
| 2003/0119585 | A1 * | 6/2003 | Walker et al. | 463/25 |
| 2003/0218303 | A1 * | 11/2003 | Walker et al. | 273/292 |
| 2003/0224852 | A1 * | 12/2003 | Walker et al. | 463/20 |
| 2003/0224854 | A1 | 12/2003 | Jao | |
| 2003/0236110 | A1 * | 12/2003 | Beaulieu et al. | 463/1 |

FOREIGN PATENT DOCUMENTS

| | | |
|---|---|---|
| EP | 0497562 A | 8/1992 |

OTHER PUBLICATIONS

International Search Report in corresponding International Application No. 05724892.4 dated, Jul. 6, 2009.

* cited by examiner

*Primary Examiner*—Dmitry Suhol
*Assistant Examiner*—Milap Shah
(74) *Attorney, Agent, or Firm*—Lando & Anastasi

(57) ABSTRACT

A method of playing a game (e.g., blackjack or other wagering game), where the user is provided with the option of purchasing bet insurance by paying an additional fee at the time the time he/she pays the subscription fee. At a predetermined time during the course of the subscription period, and if the player is below a predetermined number of total points or other standing, the player's bet protection is automatically applied, and the player is refunded his initial subscription fee with the gaming operator keeping the insurance fee. Further, the player is eliminated from the plurality of game sessions for the remaining time of that subscription period.

39 Claims, 9 Drawing Sheets

SYSTEM AND METHOD FOR PERFORMING BET PROTECTION

RELATED APPLICATIONS

This application claims priority under 35 U.S.C. §119(e) to U.S. Provisional Application Ser. No. 60/550,779 entitled "SYSTEM AND METHOD FOR PERFORMING BET PROTECTION," filed on Mar. 5, 2004, and this application is herein incorporated by reference in its entirety.

BACKGROUND OF THE INVENTION

1. Field of the Invention

The field of the invention relates generally to gaming, and more particularly to games having protection for bets placed by a player.

2. Background of the Related Art

Casino games are popular, and recently many varieties of new Casino games have been introduced, especially those that can be played over a network such as the Internet. These games allow, in some jurisdictions, players to make bets and win prizes as if they were playing in a casino. The Internet has gained a great deal of popularity on certain "betting" card games, such as blackjack. The rules of these types of games are similar to those played in a casino, and therefore, these games have similar odds of winning as casino games.

Bet protection is often used by players engaging in gaming in order to limit their risk in playing the game. One such game in which players often utilize bet protection is blackjack, where bet insurance is available in several forms—these bet protection forms are referred to as "blackjack insurance" and "surrender."

"Blackjack insurance" provides each player with the option of making a side bet if that player believes based upon the dealer upcard, that the dealer may have a blackjack. Blackjack insurance is considered a side bet because it is distinct from the player's initial bet. A player is allowed to make a blackjack insurance side bet only if the dealer upcard is an ace. Typically, a player is typically allowed to wager, for this side bet, up to one-half of his initial bet. A player wins this side bet if the card that was initially dealt face down to the dealer completes a blackjack for the dealer, and otherwise loses this side bet. A player who wins this side bet (e.g., there is a blackjack for the dealer) will typically be paid based upon his side bet using a 2:1 ratio (e.g., such that a $5 side bet results in a $15 payout). If there is no blackjack for the dealer, the player loses the side bet. Because a player who wins this side bet is likely to have lost the initial bet (e.g., the dealer's hand turned out to be a blackjack), the player's winnings on this side bet typically cancels out the player's loss on his initial bet. Thus, "blackjack insurance" allows the player to hedge his/her initial bet to lower their risk of losing. Also, with blackjack insurance, each player is allowed to place a side bet that will win if the dealer's hand turns out to be a blackjack.

Another form of bet protection in blackjack referred to as "surrender" provides each player with the option of terminating a round of play after the starting hands have been dealt. Such an option is useful in situations where that player has been dealt a "bad" starting hand that is likely to bust (if an additional card is drawn) or to lose to the dealer's hand (if an additional card is not drawn). If, for example, a player's starting hand includes a 5 and a 10 and the dealer's upcard is a Jack, only an additional card of 6 or below will not "bust" the player, while "standing" with only 15 points is likely to lose to the dealer. In this situation, the player is likely to bust or lose. Surrender is typically practiced by the player taking back one-half of his initial bet and "surrendering" the other one-half of his initial bet to the dealer while terminating the round of play. For example, if a player who made a $10 initial bet surrenders, he/she takes back $5 of his/her initial bet, surrenders the other $5 to the dealer, and terminates the round of play. Historically, the surrender option has not proven to be popular among blackjack players.

SUMMARY OF THE INVENTION

Under the conventional rules of blackjack, the player is often left in a position of not wanting to play additional hands despite having already committed an initial bet on that hand. If the player has already lost a number of hands and believes that he/she is undergoing an "unlucky" streak, he/she may become frustrated or discouraged, and may stop playing the game. When a player stops playing, the casino or the gaming site will earn no additional revenue from the player.

Therefore, according to one aspect of the present invention, it is appreciated that a more expansive form of bet protection should be provided to players that is considered "safer" by players. Preferably, such a form of bet protection prevents the player from being discouraged from playing further, and could profitably be provided by a physical, on-line or "virtual" casino offering one or more games. These games, for example, may be conventional casino games such as blackjack, or may be any other type of game with which bet protection may be implemented.

One aspect of the present invention relates to a system and method for performing bet protection. In particular, a method and system is provided for allowing a player to subscribe to more than one gaming session with an associated subscription fee, and for allowing the player to recover at least a portion of that fee under certain circumstances. In this way, the player is allowed to offset the risk of losing their subscription fee. For instance, it may be advantageous for a player to place a "bet protection" wager that acts as insurance if the player does not achieve a particular outcome within a game. In this example, a portion of the subscription fee may be refunded if the player does not achieve the particular outcome. This outcome may be, for example, a particular player standing in the game such as total points, rank, or other method for measuring standing.

One aspect of the present invention relates to providing bet protection associated with a subscription fee paid by a player to play a plurality of games. In conventional games such as blackjack, a player is allowed, within a single game, the opportunity to refund a bet associated with the single game if the bet protection criteria are met.

As discussed above with reference to blackjack, a player is likely to be dealt one or more bad "starting hands," each of which is likely to bust or to lose to the dealer's hand. Under the traditional rules of blackjack, a player who is dealt such a "bad" starting hand has limited options. If the player makes a bust insurance side bet, it is very likely that the player will lose his/her bet. Thus, "surrender" option has not proven to be extremely popular with blackjack players. Therefore, under the traditional rules of blackjack, the player is not provided many options, and, as a result, the player often becomes discouraged and stops playing the game.

Conventional games and systems that allow a user to play games such as blackjack provide additional options to players to be used in single round of play. For example, one type of game allows the player an option of placing a bust insurance side bet, which the player wins if his hand "busts" upon drawing a predetermined number of additional cards in an attempt to improve his starting hand. Another conventional option allows a player to mortgage a round of play in accordance with at least one revised rule which is unfavorable to the player in exchange for receiving an advantage (e.g. a revised rule which is favorable to the player) during the current round of play. Other conventional prior games and game systems provide insurance or bet protection options to a player, however, these types of protection are limited to a single round of play.

Various aspects of the present invention relate to providing to the player the option of purchasing bet insurance which is not limited to a single round of play. Rather, various aspects of the present invention provide insurance across a number of game sessions. Payment for insurance, may be, for example, paid at the start of the plurality of game sessions. At a predetermined point during the plurality of game sessions, the players "total" accumulated points during multiple rounds are determined resulting in the player's "standing", which is compared to a predetermined standing. If the player's total points fall below this standing number, the subscription fee is returned to the player and the insurance amount is retained by the gaming operator. For example, if the player's points total is 48 points and the predetermined standing is at least 50 points, it is determined that the player falls below this level, and thus the subscription fee is returned to the player, and the insurance fee is retained by the gaming operator.

Alternatively, the player's standing may be determined relative to the standings of other players, and players that do not meet a minimum standing may be refunded at least a portion of their subscription fee. Additionally, if the player does not meet a predetermined (e.g., a minimum) standing, the player may be eliminated from the remainder of the plurality of game sessions.

Such methods of providing insurance has advantages over conventional implementations of bet protection. For example, in conventional games that offer insurance, if a player loses during one round of play, he/she is often discouraged from engaging in further rounds due to the fear of losing even more money. Here, because the player pays a fixed subscription fee, the player can play multiple rounds without the fear of losing an excessive amount of money. The insurance amount ensures that the player will lose a limited amount of money from the outset, and limits the player's loss if the player does not achieve a particular standing in the gaming sessions. For instance, if the gaming operator determines that the standing of the player is below a predetermined level, the subscription fee is returned, and the player is eliminated from further participating ensuring that the maximum amount the player loses is his/her insurance fee. Because of the increased safety factor as a result of purchasing insurance, players are encouraged to continuously participate in games, thus resulting in further profit to the gaming operator. Also, the player is more likely to use the insurance option.

According to one aspect of the present invention, a method of conducting a game is provided. The method comprises acts of providing for an entry of a player in a plurality of game sessions, accepting payment of an entry fee associated with the plurality of game sessions, determining a standing of the player in the game, and determining whether the determined standing is determined to meet a predetermined standing, and if not, refunding at least a portion of the entry fee.

According to one embodiment of the present invention, the act of providing an entry includes an act of entering the player in a plurality of game sessions of blackjack. According to another embodiment of the present invention, the act of determining whether the determined player in a plurality of game sessions of blackjack has accrued a minimum number of points. According to one embodiment of the present invention, the method further comprises an act of receiving an entry fee from the player before the player plays the plurality of game sessions of a blackjack game. According to one embodiment of the present invention, the act of receiving the entry fee further comprises an act of providing the player with an option of paying a bet protection fee. According to one embodiment of the present invention, the bet protection fee is accepted by a gaming operator. According to one embodiment of the present invention, the method further comprises an act of eliminating a player from the plurality of gaming sessions if the player does not meet the predetermined standing.

According to another embodiment of the present invention, the player meets the predetermined standing at a midpoint of the plurality of game sessions, and wherein if it is determined that the player does meet the predetermined standing, the bet protection fee is not refunded to the player.

According to one embodiment of the present invention, if the player does meet the predetermined standard, the method further comprises an act of permitting the player to continue play in the plurality of game sessions. According to another embodiment of the present invention, if the player meets the predetermined standard, the method further comprises an act of retaining the bet protection fee. According to another embodiment of the present invention, if the player chooses not to pay the bet protection fee, and the player does not achieve a winning standing in the plurality of game sessions, the method further comprises an act of retaining the entry fee.

According to another embodiment, the method further comprises an act of providing for an entry of the player in at least one game session using an alternative method of entry (AMOE). According to another embodiment, the AMOE is performed by at least one of a mail entry or through the Internet.

According to another aspect of the present invention, a system is provided for conducting a plurality of game sessions. The system comprises an interface that receives from a user an entry to a plurality of game sessions, a payment component adapted to accept an entry fee associated with the plurality of game sessions, and is adapted to accept a bet protection fee that offsets at least a portion of the risk of losing the entry fee.

According to one embodiment of the present invention, the system further comprises a controller adapted to determine a standing of the player in the plurality of game sessions. According to another embodiment of the present invention, the controller is further adapted to conduct the plurality of game sessions.

According to one embodiment of the present invention, the system further comprises means for storing a predetermined standing, and wherein the controller is adapted to compare the determined standing and the predetermined standing. According to one aspect of the present invention, the controller is further adapted to, if the player does not meet the predetermined standing, eliminate the player from playing in the plurality of game sessions. According to one aspect of the present invention, the payment component is adapted to provide payment to an external payment system. According to another aspect of the present invention, the payment component is located in a legal gambling jurisdiction.

According to another embodiment of the present invention, the system further comprises means for entering the player in at least one game session using an alternative method of entry (AMOE). According to another embodiment, the system further comprises means for entering the player using AMOE by at least one of a mail entry or through the Internet.

Further features and advantages of the present invention as well as the structure of various embodiments of the present invention will be more fully understood from the examples described below with reference to the accompanying drawings. The following examples are intended to illustrate the benefits of the present invention, but do not exemplify the full scope of the invention. All references cited herein are expressly incorporated by reference.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

One aspect of the invention relates to a method for protecting bets placed by a player. As discussed, a player is allowed to subscribe to more than one game session with an associated subscription fee, and the player is allowed to offset the risk of losing at least a portion of that fee by placing a bet protection wager. This wager acts as insurance if the player does not achieve a particular outcome in the multiple gaming sessions.

Such a method for implementing a bet protection may be performed on a general-purpose computer system as discussed further below in relation to FIG. 1. More particularly, a gaming system may be provided that presents a game and having an interface through which a player may obtain a protection for a bet. In one embodiment, the bet protection wager is associated with a subscription fee paid by a player to play multiple game sessions. These game sessions may be, for example, the same game, different games or combinations of different sets of games.

Figure 3:
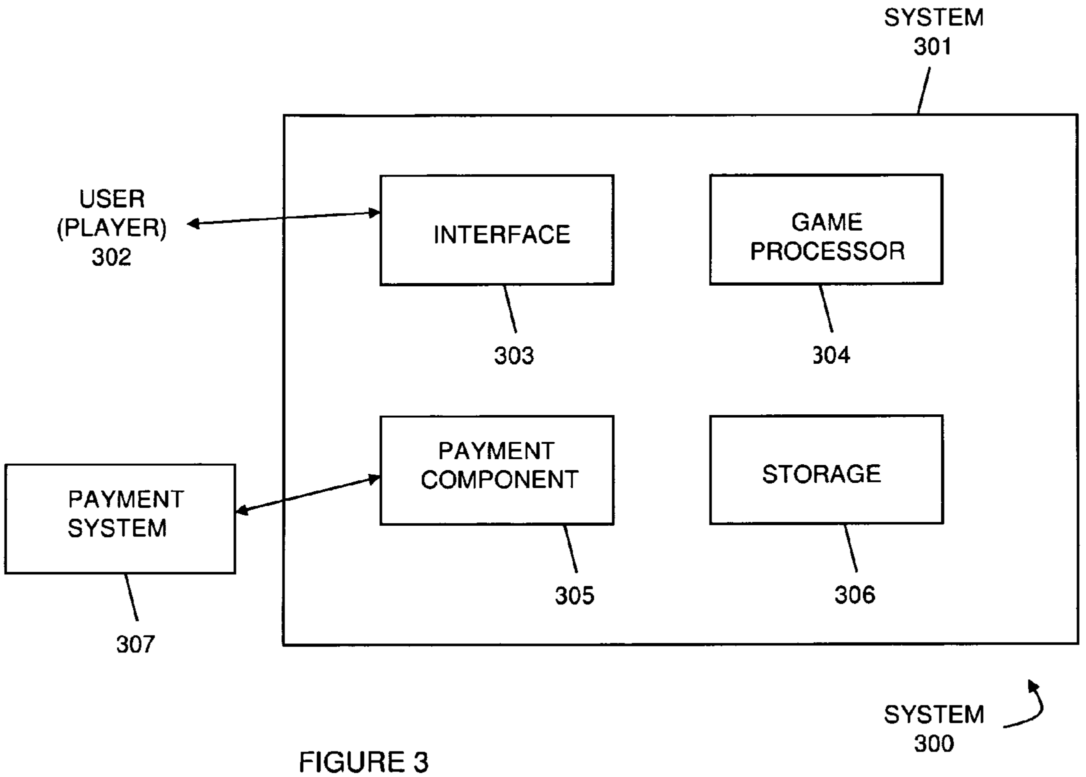
FIG. 3 is a block diagram of a system for operating a plurality of game sessions in accordance with one embodiment of the present invention.

FIG. 3 shows a block diagram of a system for operating a plurality of game sessions in accordance with one embodiment of the present invention. System 300 includes a system, which may be, for example, a general-purpose computer system as described below with reference to FIG. 1, for placing a bet protection wager.

System 301 includes an interface 303 that interacts with a user (e.g., a player) 302 to place bets and communicate information relating to a game session. Interface 303 may be, for example, an interface of a computer system. For example, interface 303 may include an interface presented by a browser program operating in a memory of a computer system. In one specific example, the computer system upon which the interface 303 may reside includes a general purpose computer system associated with the player, such as a personal computer (PC).

System 300 may also include a game processor 304 which performs functions relating to one or more game sessions. Game processor 304 may be, for example, a process executing in a memory of system 301. Processor 304 may receive and process bets placed by users through interface 303, conduct game sessions and rules of the game, and determine wins and payouts to players.

Information relating to game sessions may be stored in one or more storage entities 306 (e.g., a device such as a disk) associated with system 301. Storage 306 may, for example, store information directly relating to game play (e.g., a number of players, current score, current state of game play) or other information relating to game play and payment. System 301 may include a payment component 305 that receives payment information from a user 302 through interface 303 to pay for bets placed by the player. Payments may include, for example, wagers placed by players or any additional bets (e.g., bet protection payments) paid by a player in association with playing a game. Payment component 305 may communicate with one or more payment systems 307 for the purpose of obtaining payment for playing the game.

One or more components of system 300 may be located on one or more computer systems. For example, components of system 301 may be distributed on multiple computers coupled by a communication network. It should be appreciated that components of system 300 may reside on a single computer or may be distributed among multiple computers, and the invention is not limited to any particular implementation.

Prior to a game session, a game player may need to pay for playing. For example, a game player may pay using money or loyalty points. In particular, a game player may pay using money by debit card, credit card, check, cash or from an account credit either with the gaming operator or an affiliated organization. Alternatively, a game player may pay using loyalty points from an account held either by the gaming operator or by an affiliated organization. Loyalty points may be obtained from any type of organization but are generally associated with loyalty programs such as frequent flier programs for airlines, frequent stay programs for hotels, or frequent visitor programs for casinos. The game player may pay in person (e.g., by using a cashier) or by other remote methods including telephone, handheld device, kiosk, computer through the Internet (or other network), and mail. Payment may be in any form that is legal in the particular jurisdiction.

In one embodiment of the invention, players may subscribe to play multiple consecutive game sessions. That is, the player pays at one time to play many consecutive game sessions. According to one embodiment, such players may subscribe to multiple games (e.g., fixed-odds or non-fixed odds games) using a computer based interface (e.g., a personal computer, cell phone, PDA, set-top box or other interface). In one example, these subscribed games may be automatically played (e.g., by a computer system) without the need to interact with the game provider as discussed more fully below. In another embodiment, the player may also choose to have his or her subscription automatically renewed. These games may be, for example, conventional casino-type games such as blackjack. They may involve skill on the part of a player to influence outcome of the game, or they may be pure games of chance.

Figure 4:
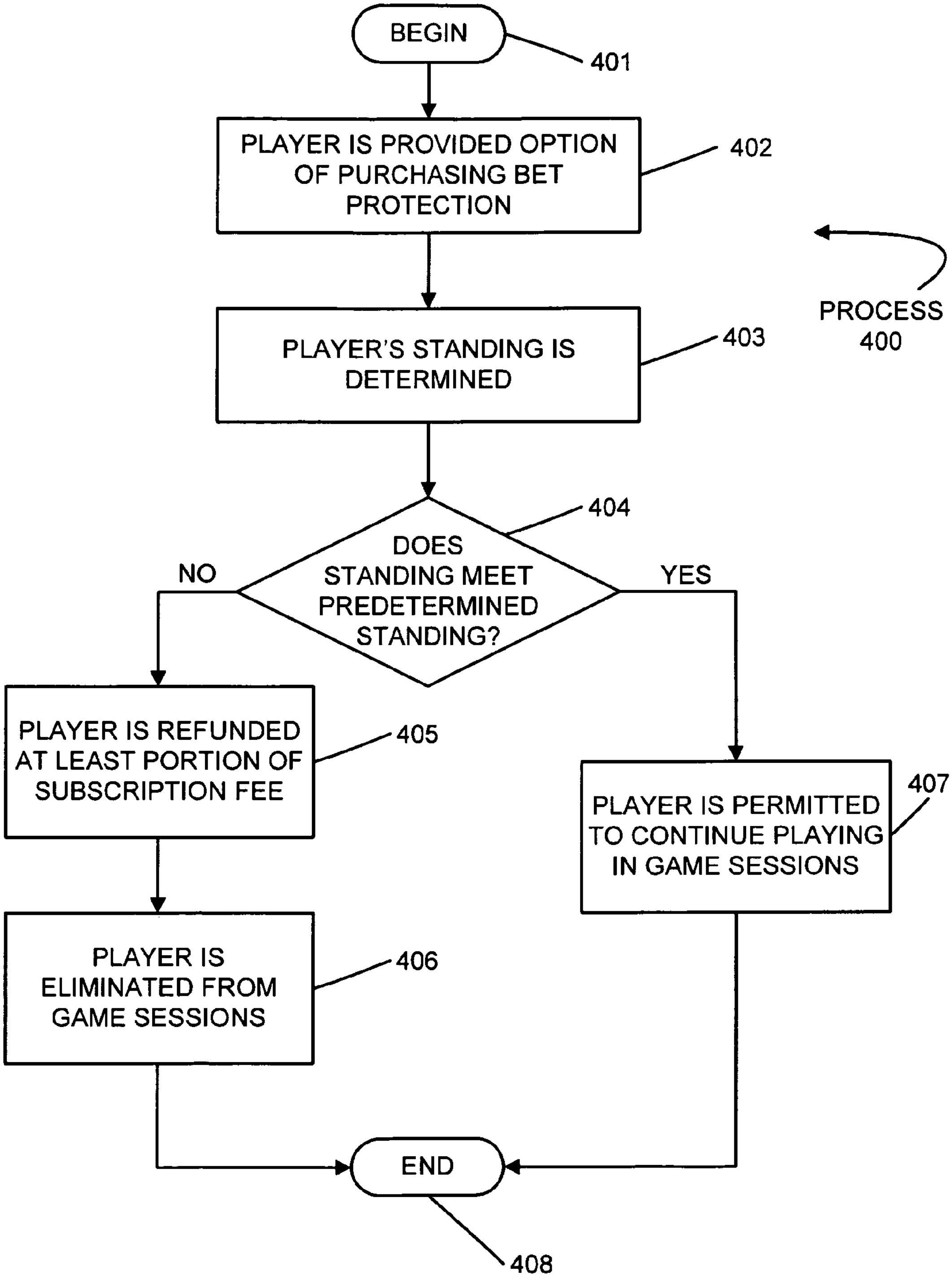
FIG. 4 is a flow chart of a process for playing a plurality of game sessions according to one embodiment of the present invention.

According to one embodiment of the invention, a player may be provided the option of purchasing bet protection to offset the risk of losing a subscription fee for playing multiple games. An example process 400 for playing a plurality of game sessions involving the purchase of bet protection is shown in FIG. 4. At block 401, process 400 begins. At block 402, a player is provided an option for purchasing bet protection. This may be presented, for example, by an interface (e.g., interface 303) of a computer system (e.g., system 301).

In one example, the player is allowed to purchase bet protection prior to the game, at the beginning of the game, or during game play. At some point during or at the end of playing multiple games, a player's standing is determined at block 403. A player's standing may be determined, for example, by a game processor 304 that conducts game play.

The player's standing may be, for example, based at least in part on the number of points accrued or levels achieved by the player within the game. Alternatively, the player's standing may be determined relative to the standings of other players within the game. If, at block 404, the player's standing does not meet a predetermined standing, the player is refunded at least a portion of the subscription fee at block 405. In this manner, the risk of losing the subscription fee by the player for play at a level lower than the predetermined standing may be offset by paying an additional bet protection fee. At block 406, the player may be eliminated from playing further game sessions. For instance, in a multiplayer game occurring over multiple game sessions, the player may be eliminated from further play in the multiplayer game.

If, at block 404 it is determined that the player does meet a predetermined standing, the player is permitted to continue to play in further game sessions. The predetermined standing may be, for example, an arbitrary standing or other criteria used to measure the advancement of the player within one or multiple game sessions. Such criteria may include the number of points achieved, money, or other parameter. Notably, if the player meets the predetermined standing, the bet protection is not activated, and the player continues playing. In one example, if the bet protection is not activated at the point of evaluation of the player's standing, the bet protection is not activated during any point in the play of the remaining game sessions. At block 408, process 400 ends.

Figure 5:
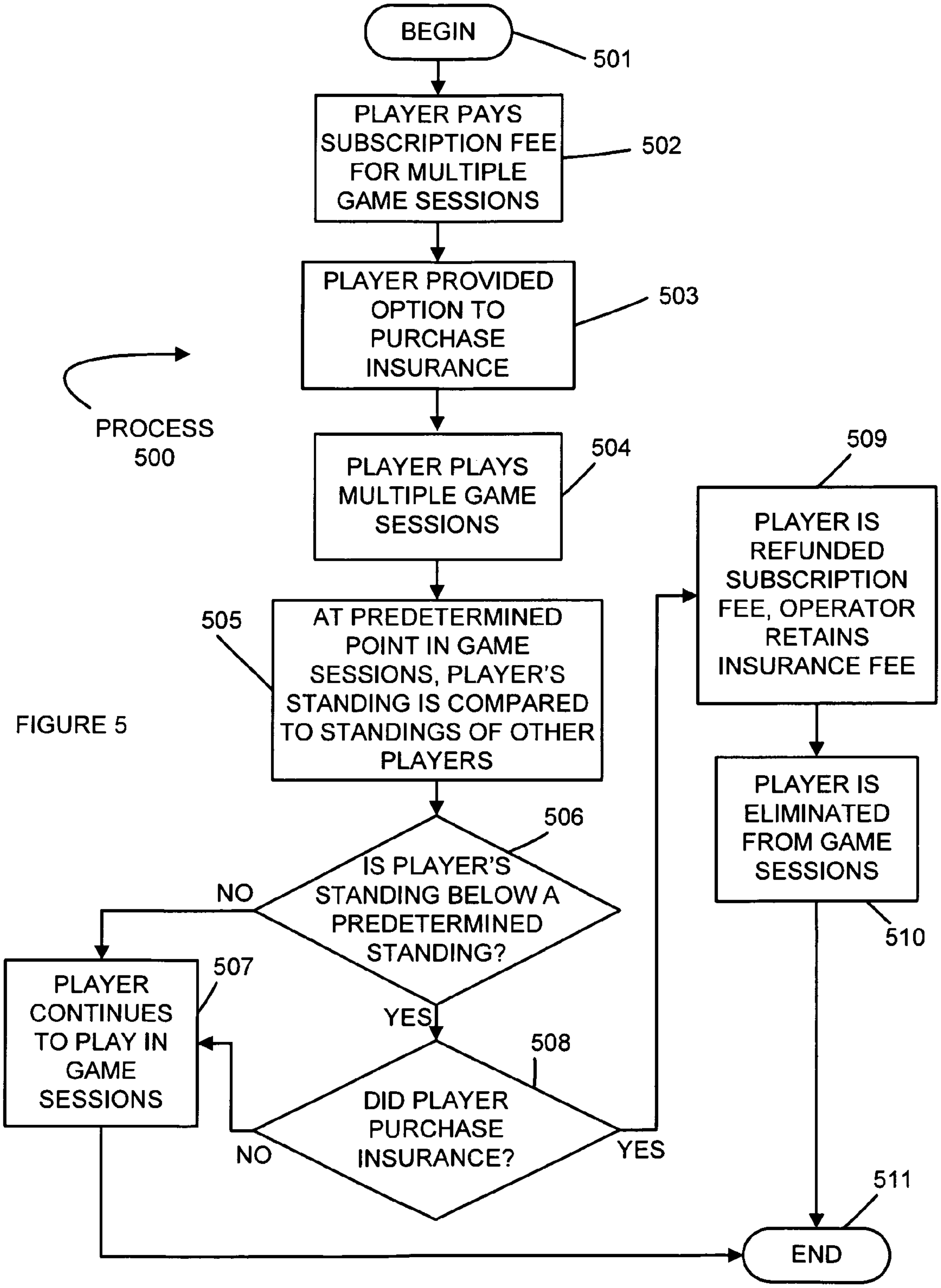
FIG. 5 is a flow chart of a process for playing a plurality of game sessions according to another embodiment of the present invention.

FIG. 5 shows a flow chart of a process for playing a plurality of game sessions according to another embodiment of the present invention. At block 501, process 500 begins. At block 502, a player pays a subscription fee to play multiple game sessions. Payment may be performed, for example, by many different methods as described above. At or near the point at which the player subscribes to multiple game sessions, the player is provided an option for purchasing bet protection or insurance at block 503. Payment for the bet protection may be performed in any manner, including methods for paying by subscription as described above.

At block 504, the player plays one or more of the multiple game sessions. At a predetermined point during game session play, a player's standing is compared to the standings of other players at block 505. At block 506, it is determined whether a player's standing is below a predetermined standing (e.g., a minimum standing). If, at block 506 it is determined that a player's standing is not below the predetermined standing, the player is allowed to continue to play in one or more remaining game sessions at block 507. If, however, the player's standing is below the predetermined standing, it is determined whether the player purchased insurance at block 508. If not, the player is permitted to continue to play in one or more remaining game sessions.

If the player did purchase insurance, the player is refunded their subscription fee at block 509. In one example, the player may be refunded the full subscription fee, but it should be appreciated that, in one embodiment, a portion of this fee may be retained by the gaming operator. Further, the operator may retain the insurance or bet protection fee at block 509. As a further option, the player may be eliminated from playing in one or more remaining game sessions at block 510. For example, in a multiplayer game involving multiple game sessions, the player may be eliminated from the multiplayer game and may be prohibited from playing in any further game sessions. At block 511, process 500 ends.

According to one embodiment of the invention, players may also enter to play this or any other wagering game of chance using an alternative method of entry (AMOE). Conventionally, AMOE is a required available method of entry that does not require a purchase. Sweepstakes are usually used as a promotional or marketing tool. Any company or organization offering a sweepstakes ticket in exchange for a purchase is typically required to also offer an AMOE to the sweepstakes that is not linked to a purchase. A common AMOE method includes sending, by an individual interested in entering the sweepstakes, to the sweepstakes offeror, a postcard with his or her name, address or other contact information. Another AMOE method is signing on, by the individual, to a free Internet website and submit the required information for free. Numerous other methods may be used for AMOE. Most sweepstakes limit the number of times one individual or family may enter a sweepstakes by AMOE. An individual entering a sweepstakes by AMOE is required by law to have the same odds of winning each of the available prizes as do individuals who have paid for entry (e.g., by making a purchase of a product or service).

According to one embodiment of the invention, it is realized that an AMOE (alternative method of entry) may be used to enter a game of chance. More particularly, it is possible to develop, implement and run wagering games of chance, including the inventive games described herein, with an AMOE method of entry. AMOE methods are conventionally used to enter a player in a sweepstakes, which is not considered wagering or gambling. Thus, according to one embodiment of the invention, an individual may enter a wagering game of chance by AMOE using, for example, the postcard or the online method outlined above. A wagering game of chance player entering by AMOE may have the same odds to win the payout associated with the game session in which they are entered as other paying players. The wagering game of chance player entering by AMOE may also be limited in playing a small number of game sessions within a given period of time. For example, the player may be permitted to play one game session in one year, two game sessions in one month, or other limited number of games in a defined period. Other numbers of sessions and given periods may be any number, and the invention is not limited to any particular implementation.

According to one embodiment, the game session that the game player entering by AMOE is entered into may be determined by the game player on the AMOE entry form. For example, the postcard AMOE may be required to state the date and the time of the game session that the game player wants to enter. Alternatively, the game session entered into by the game player may be the next starting game session after the AMOE is received and logged. As another alternative, AMOE entries may be assigned to a specific game session(s) each hour, day, week or other time interval.

Winners may be chosen among multiple players having particular hands (e.g., in the case of blackjack), cell content (e.g., as in bingo or similar game), or other content relating to a game of skill or chance. Winning content may be randomly drawn by hand or by computer system from the predetermined set of cell content for a game session. When the drawing is performed by hand, the winning cell content may be chosen, for example from pieces of paper out of a hat or drum, by using balls or discs in a rotating or air blown sphere, or any other method that can be used for drawing content for a game session (e.g., for the games of keno or bingo). Hand-drawn winning content may then be displayed or entered into a computer system. Preferably, the winning content is randomly drawn by computer system from the predetermined set of content for a particular game session.

The game player may view the game proceedings using television, wireless or line telephone with display, handheld device, kiosk, computer or in person. For example, the game player may operate a computer system that has an Internet-enabled interface (e.g., using Macromedia Flash or Java) and the computer system may display streamed game information within that interface. It should be appreciated that any interface may be used to display game proceedings and that the invention is not limited to any particular interface. Depending upon the viewing medium, it may be necessary to download game information prior to viewing while another viewing medium may allow viewing of the streamed game information.

When a player matches enough winning content to obtain a winning pattern/outcome for a game session, the player may inform the game operator (e.g., in the case of bingo) that he/she is a winner. If the game player is playing the game in person, this act of informing may include raising one's hand or visually indicating that he or she is a winner. The game operator then verifies that the game player actually won. If the game player plays the game remotely, for instance over the web or interactive television, or if the game operator is a computer system, then other electronic or voice indication method may be necessary to authenticate and verify the game player and the winner(s). Such methods are well-known in the remote and electronic gaming industry.

In the case of a bingo-like game, a player may manually daub his or her game card(s) on paper or by whatever means the player is viewing the game proceedings (e.g., by daubing a game card in an interface of a computer system) after a winning content is drawn. Preferably, a computer system (e.g., a personal computer PC, set top box, PDA, phone) may automatically daub the matching cell content of each game card being played in a game session after each drawn winning cell content. The game player may view the game proceedings using any interface including a television, a wireless or other type of telephone having a display, a handheld device, a kiosk or computer. However, because the computer is adapted to automatically daub matching cell content, the game player may decide not to observe the drawing of winning cell content.

The computer system may then automatically determine when a game card or hand is a winner. Such a result may be automatically authenticated and verified by the computer system. In this instance, the computer system may then notify the game player that he or she has won and what the winnings (e.g., cash, points, etc.) are after the computer has consulted a predetermined payout table. The computer may also determine if the winning needs to be shared with other winning game cards. Notification of winning to a game player may occur by mail, e-mail, computer web or network, telephone, television, pager, fax, kiosk or any other method.

The computer system may also determine the game card(s) or hands and the associated player identity(ies) that are closest to winning. The computer system may then display the game card(s), hands or the identity of the game player(s) closest to winning to all game players observing the game session. The computer system may also choose to display only one or a subset of all the game cards, hands or identities of players closest to winning to a particular game player observing the game session.

After a winner is authenticated and verified, the computer system may then notify all game players observing the game session that a win has occurred. Additionally, the computer system may display the winning game card or hand, the winning player's identity or the payout. Because the game session may not end until a predetermined fixed number of turns or predetermined amount of time has passed, it is possible for this notification to occur several times, each time for a different game card or hand during a particular game session.

During a period of time between game sessions, a game operator may make announcements, rest, or perform any number of actions. If the game is played using a computer system, advertisements, sponsorships, public service announcements or any visual or auditory content may be inserted into these periods. Advertisements, and other content may also be inserted into the game display during a game session.

In a configuration where the computer automatically daubs the game cards or plays hands for one or more players, it may be beneficial to allow a game player to remotely access information indicating the results of a game session after the session has completed. In this manner, a player may not need to attend a particular game session, as results of each session may be accessed at a later time. Further, the player need not access the game session results from the same interface at which the game was played or subscribed. Remote access may be gained, for example, by kiosk, telephone, television, computer, handheld device or any other device or system that is appropriate. Information that may be accessed regarding a past game session may include whether the player won or lost, what the player's payout was, or other information relating to the past game session.

A game player may also be able to replay or review a past game session using a video-enabled device. For instance, a kiosk, telephone having a display, television, computer or handheld device may be used to replay a past game session. By accessing a selected game session in the computer system, a game player may be able to see a past game session as it occurred, the winning hands or cards, and winning game player identity(ies), the drawn winning cell content, or possibly any other aspect of the game session of interest.

Preferably, the game, its game sessions, and the game play are partially or fully automated using one or more computer systems. More preferably, the game, its game sessions, and the game play are fully automated. A computer system may be a single computer that may be a supercomputer, minicomputer or a mainframe or personal computer. A computer system used to run a game and its associates sessions and may also include any combination of computer system types that cooperate to accomplish system-level tasks. Multiple computer systems may also be used to run a game. The computer system also may include input or output devices, displays, or storage units. It should be appreciated that any computer system or systems may be used, and the invention is not limited to any number, type, or configuration of computer systems.

Figure 6:
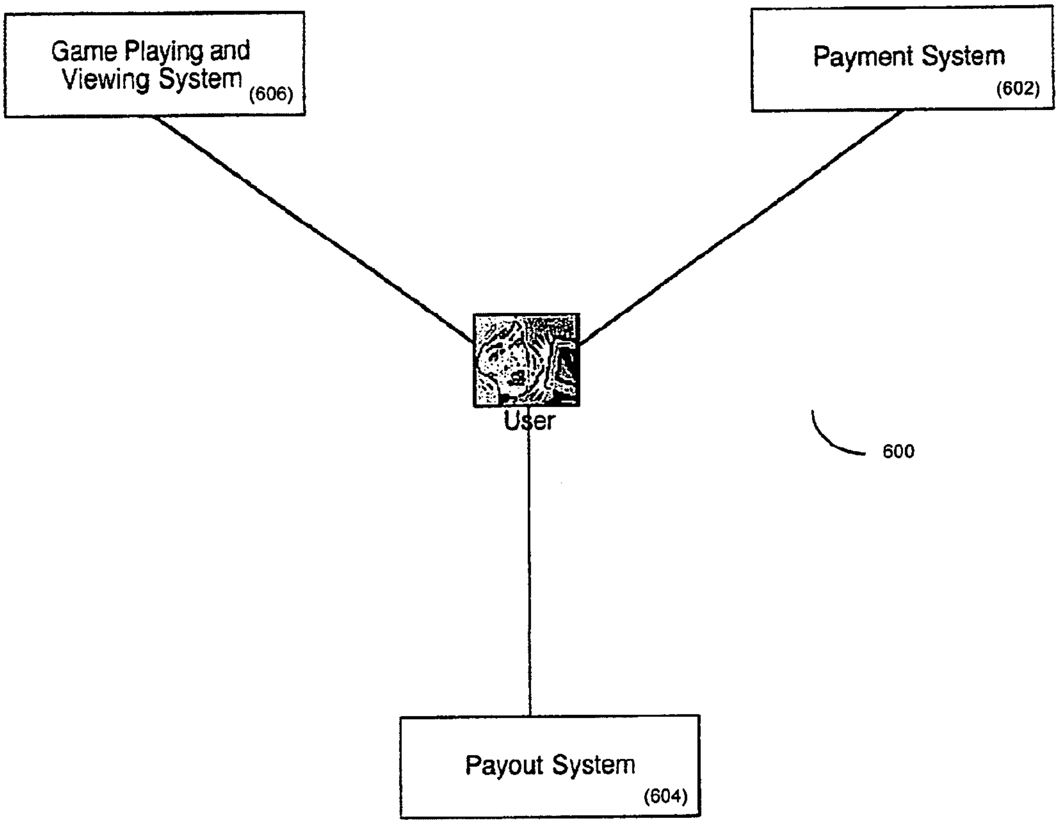
FIG. 6 is a block diagram of a system through which a user may subscribe and play one or more game sessions according to various embodiments of the present invention.

A computer system that executes a game according to various embodiments of the invention may include, for example, one or more system components. One such system 600 is shown by way of example in FIG. 6. In the example, one system component (e.g., payment system 602) may handle payment, subscription and/or AMOE by players to enter the game sessions. Another system component (e.g., system 606) may handle playing and viewing the game and a third system component (e.g., system 604) may perform payout functions. Such a game system may also be connected (e.g., by direct line or network) to other computer systems including systems for handling casino or hotel loyalty programs, reservations, in-room television viewing, gambling floor kiosks, or other systems. Connections to other computer systems may be performed using one or more of the system components described below.

Figure 7:
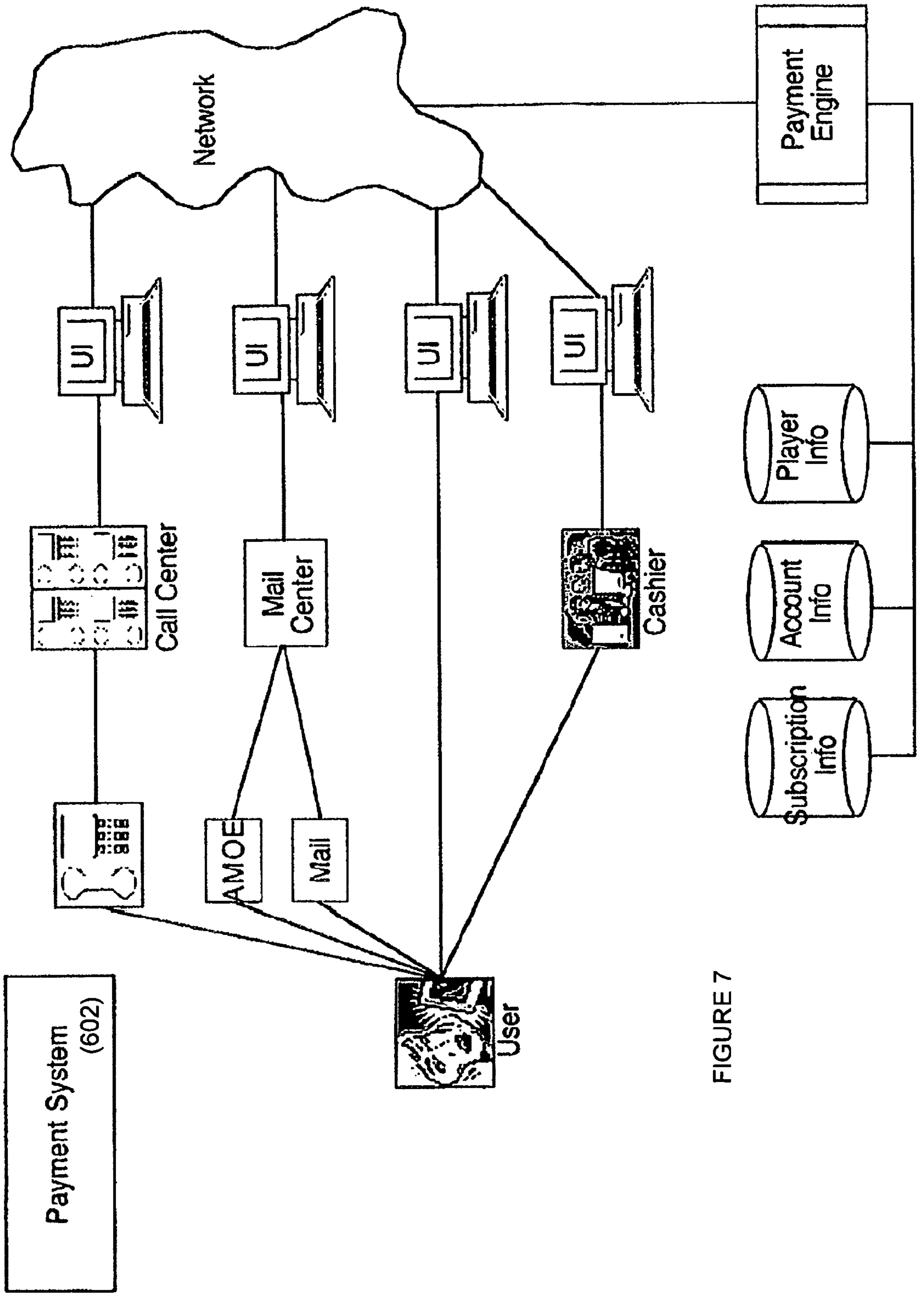
FIG. 7 is a block diagram of a payment system that may be used in association with various aspects of the present invention.

A payment component (e.g., system 602) may include one or more of a number of well-known systems as shown in FIG. 7. For example, a player may be able to pay to play one or more games using a telephone and speaking with a call center representative who inputs player, payment and subscription information manually into a computer using a user interface. In the computer, data may be stored in a data which is stored in a memory of the computer system. As used herein, a "data structure" is an arrangement of data defined by computer-readable signals. These signals may be read by a computer system, stored on a medium associated with a computer system (e.g., in a memory, on a disk, etc.) and may be transmitted to one or more other computer systems over a communications medium such as, for example, a network. Also as used herein, a "user interface" or "UI" is an interface between a human user and a computer that enables communication between a user and a computer. Examples of UIs that may be implemented with various aspects of the invention include a graphical user interface (GUI), a display screen, a mouse, a keyboard, a keypad, a track ball, a microphone (e.g., to be used in conjunction with a voice recognition system), a speaker, a touch screen, a game controller (e.g., a joystick) etc, and any combinations thereof.

Player information may also be entered into a payment system component. Player information that may be input includes name, address, telephone number and age, and payment information may include credit or debit card number or loyalty account information. Also, as discussed above, various aspects of the present invention relate to subscription gaming for wagering games of skill or chance. Subscription information may be input, including, for example, a first game session date and time, a number of game sessions to be played, a number of game pieces to be played per game session and bet per game piece, bet per hand, or other parameters. Based upon the payment and subscription information, the call center representative may verify that the payment information is valid and that enough credit or funds is available for the player's desired subscription.

A similar system may exist for players entering using a mail or a postcard AMOE as discussed above, except the call center may be replaced by a mail center having representatives that enter information into one or more computers via a user interface. For example, a cashier that works at a casino directly with players that pay cash or credit to play, may also have the ability to input player, account and subscription information for AMOE players using a user interface of computer.

Computer systems or pay engines for handling electronic or online payment and subscriptions may also be used. Such systems are well-known, and include such systems as PayPal, iKobo, Verisign, and other systems. Using such a system, a player interacts with a user interface to input information into a payment data structure that may be transferred to one or more payment systems (e.g., PayPal).

Various payment systems and one or more user interfaces may be located on computer systems coupled by a network with the computer system(s) storing data having player, account and subscription information. As used herein, a "network" or a "communications network" is a group of two or more devices interconnected by one or more segments of transmission media or active communications equipment on which communications may be exchanged between the devices.

The above examples are merely illustrative embodiments of a payment system component. It should be appreciated that an illustrative embodiment is not intended to limit the scope of the invention, as any of numerous other implementations of a payment system, for example, variations of online payment, are possible and are intended to fall within the scope of the present invention. For example, the payment system may include using pay-per-view systems associated with interactive television or the pay engine may additionally deliver a receipt to the player by either e-mail or mail. None of the claims set forth below are intended to be limited to any particular implementation of a payment system unless such claim includes a limitation explicitly reciting a particular implementation.

Figure 8:
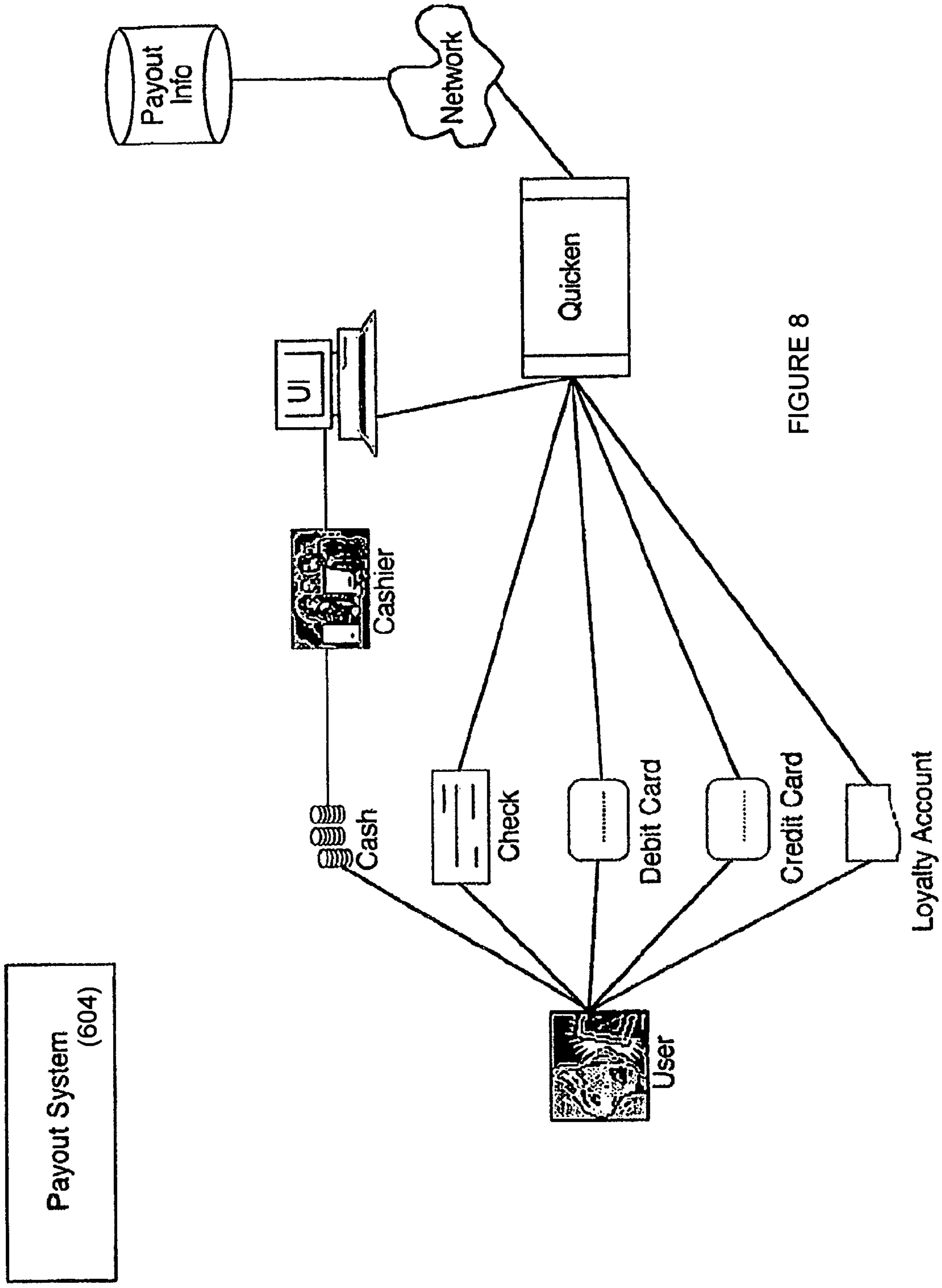
FIG. 8 is a block diagram of a payout system that may be used in association with various aspects of the present invention.

Payout systems are also well known. Any of a number of standard systems or payout engines for making payouts for winning may be used as shown in FIG. 8. For example, a standard application programming interface such as 'Quicken' (Intuit Inc., Mountain View, Calif., USA) may be used to write and mail checks or credit a debit card, credit card (if legal in the jurisdiction of play) or loyalty account. 'Quicken' may obtain the payout information by accessing a payout data structure across a network. As used herein, an "application programming interface" or "API" is a set of one or more computer-readable instructions that provide access to one or more other sets of computer-readable instructions that define functions, so that such functions can be configured to be executed on a computer in conjunction with an application program.

'Quicken' is merely an illustrative embodiment of the payout system. Such an illustrative embodiment is not intended to limit the scope of the invention, as any of numerous other implementations of the payout system, for example, variations of online payout, are possible and are intended to fall within the scope of the invention. Additionally, a cashier may also have access to payout information using a user interface to the payout data structure through a network; the cashier then makes a payment to the winning player based upon the accessed information. None of the claims set forth below are intended to be limited to any particular implementation of a pay system unless such claim includes a limitation explicitly reciting a particular implementation.

Figure 9:
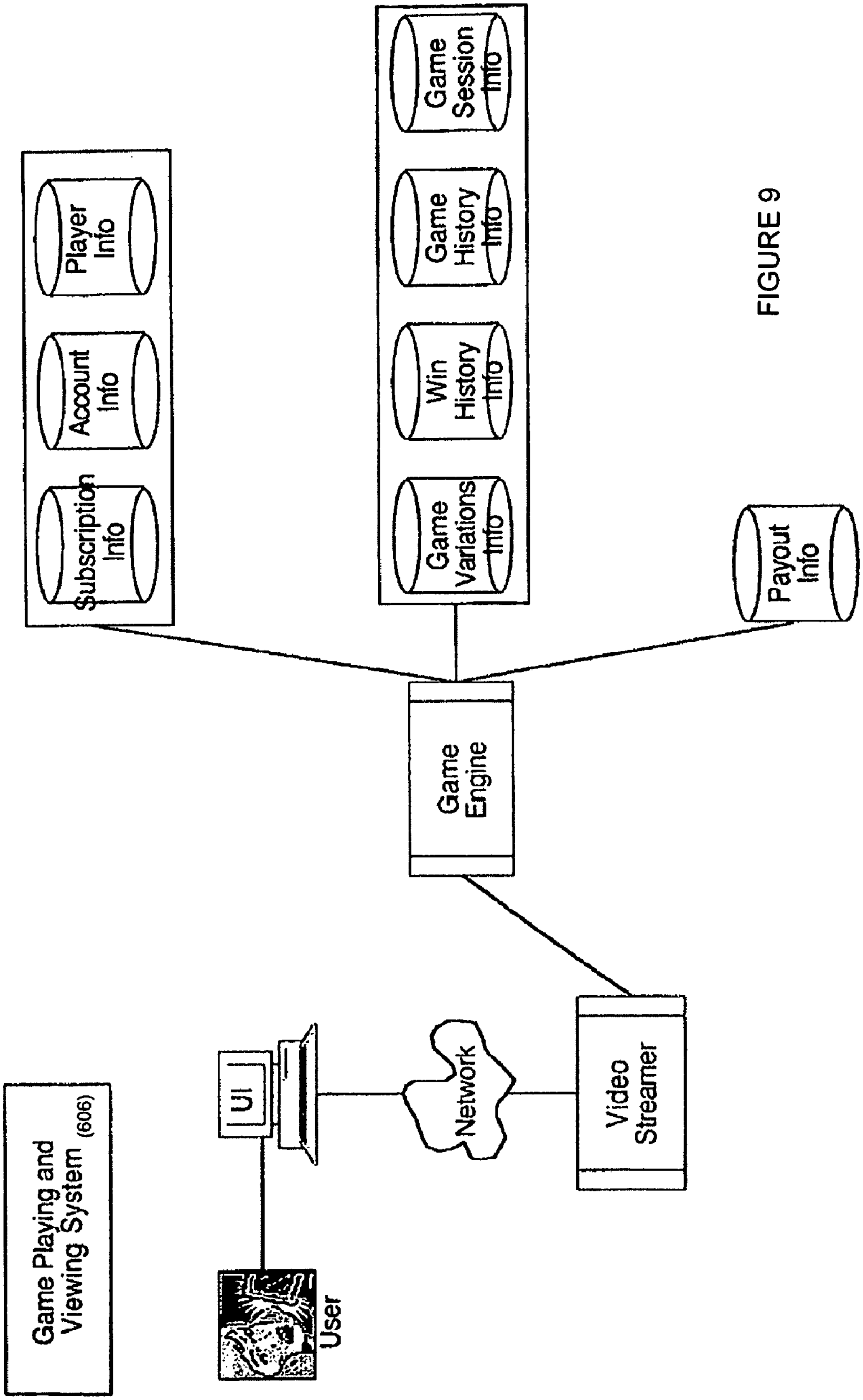
FIG. 9 is a block diagram of a game playing and viewing system according to one embodiment of the present invention.

A game playing and viewing system according to one embodiment of the invention may comprise of a number of components for performing specific functions as shown in FIG. 9. These components may include, for example, storage elements that store data structures having information relating to game configuration and game play. For example, such information may include game variation information, present game session information, game session history and win history. A game playing and viewing system may also include components to access payment and payout data structures.

It should be appreciated that game play processes 400 and 500 may include more or less acts as shown in FIGS. 4 and 5, and that the invention is not limited to any particular number of order of acts (e.g., the order illustrated in FIGS. 4 and 5), as the acts may be performed in other orders, may include additional acts and one or more of the acts of processes 300, 400 may be performed in series or in parallel to one or more other acts, or parts thereof.

Processes 400 and 500 are merely an illustrative embodiment of a method for performing game play (e.g., by a game engine). Such illustrative embodiments are not intended to limit the scope of the invention, as any of numerous other implementations for performing game play. None of the claims set forth below are intended to be limited to any particular implementation of a method of game play unless such claim includes a limitation explicitly reciting a particular implementation.

Processes 400 and 500, acts thereof and various embodiments and variations of these methods and acts, individually or in combination, may be defined by computer-readable signals tangibly embodied on a computer-readable medium, for example, a non-volatile recording medium, an integrated circuit memory element, or a combination thereof. Such signals may define instructions, for example, as part of one or more programs, that as a result of being executed by a computer, instruct the computer to perform one or more of the methods or acts described herein, and/or various embodiments, variations and combinations thereof. Such instructions may be written in any of a plurality of programming languages, for example, Java, Visual Basic, C, C#, or C++, Fortran, Pascal, Eiffel, Basic, COBOL, etc., or any of a variety of combinations thereof. The computer-readable medium on which such instructions are stored may reside on one or more of the components of a general-purpose computer described above, and may be distributed across one or more of such components.

The computer-readable medium may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

It should be appreciated that any single component or collection of multiple components of a computer system, for example, the computer system described below in relation to FIG. 1, that perform the functions described above with respect to describe or reference the method can be generically considered as one or more controllers that control the above-discussed functions. The one or more controllers can be implemented in numerous ways, such as with dedicated hardware, or using a processor that is programmed using microcode or software to perform the functions recited above.

Another component of the game playing and viewing system may include a software component (e.g., a driver) that streams video via a broadband, satellite or wireless medium to a user interface. If the game is played completely automatically, the user interface may be merely a video terminal including television with no user input means. Viewing access may be controlled by standard methods for conditional access including using set top box addresses, telephone numbers or internet protocol (IP) addresses.

The above is merely an illustrative embodiment of a game playing and viewing system. Such an illustrative embodiment is not intended to limit the scope of the invention, as any of numerous other implementations of a game playing and viewing system, for example, variations of conditional access, are possible and are intended to fall within the scope of the invention. None of the claims set forth below are intended to be limited to any particular implementation of a game playing and viewing system unless such claim includes a limitation explicitly reciting a particular implementation.

System 600, and components thereof such as the payment, payout and game engines, may be implemented using software (e.g., C, C#, C++, Java, or a combination thereof), hardware (e.g., one or more application-specific integrated circuits, processors or other hardware), firmware (e.g., electrically-programmed memory) or any combination thereof. One or more of the components of system 600 may reside on a single system (e.g., the payment subsystem), or one or more components may reside on separate, discrete systems. Further, each component may be distributed across multiple systems, and one or more of the systems may be interconnected.

Further, on each of the one or more systems that include one or more components of system 600, each of the components may reside in one or more locations on the system. For example, different portions of the components of system 600 may reside in different areas of memory (e.g., RAM, ROM, disk, etc.) on the system. Each of such one or more systems may include, among other components, a plurality of known components such as one or more processors, a memory system, a disk storage system, one or more network interfaces, and one or more busses or other internal communication links interconnecting the various components.

System 600 may be implemented on one or more computer systems described below in relation to FIGS. 1 and 2.

System 600 is merely an illustrative embodiment of the game system. Such an illustrative embodiment is not intended to limit the scope of the invention, as any of numerous other implementations of the game system, for example, variations of 300, are possible and are intended to fall within the scope of the invention. For example, a parallel system for viewing by interactive television may include one or more additional video streamers specific for interactive television. None of the claims set forth below are intended to be limited to any particular implementation of the game system unless such claim includes a limitation explicitly reciting a particular implementation.

As discussed above, various embodiments according to the invention may be implemented on one or more computer systems. These computer systems, may be, for example, general-purpose computers such as those based on Intel PENTIUM-type processor, Motorola PowerPC, Sun UltraSPARC, Hewlett-Packard PA-RISC processors, or any other type of processor. It should be appreciated that one or more of any type computer system may be used to partially or fully automate play of the described game according to various embodiments of the invention. Further, the software design system may be located on a single computer or may be distributed among a plurality of computers attached by a communications network.

A general-purpose computer system according to one embodiment of the invention is configured to perform any of the described game functions including but not limited to player subscription or payment, game piece or card selection, drawing winning cell content, daubing matching cell content on game cards, automatically playing hands in card games, betting, determining winners, and paying winners. It should be appreciated that the system may perform other functions, including network communication, and the invention is not limited to having any particular function or set of functions.

Figure 1:
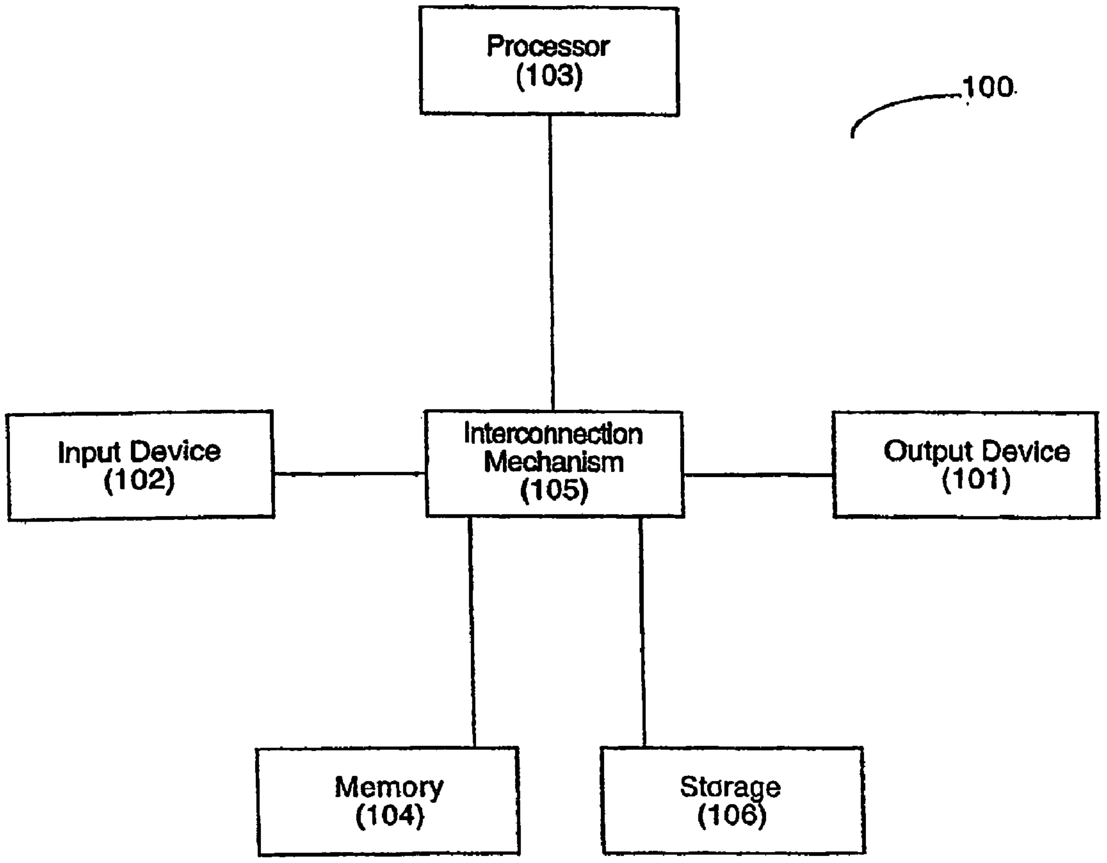
FIG. 1 is a block diagram of a general purpose computer system upon which various embodiments of the invention may be implemented.

For example, various aspects of the invention may be implemented as specialized software executing in a general-purpose computer system 100 such as that shown in FIG. 1. The computer system 100 may include a processor 103 connected to one or more memory devices 104, such as a disk drive, memory, or other device for storing data. Memory 104 is typically used for storing programs and data during operation of the computer system 100. Components of computer system 100 may be coupled by an interconnection mechanism 105, which may include one or more busses (e.g., between components that are integrated within a same machine) and/or a network (e.g., between components that reside on separate discrete machines). The interconnection mechanism 105 enables communications (e.g., data, instructions) to be exchanged between system components of system 100. Computer system 100 also includes one or more input devices 102, for example, a keyboard, mouse, trackball, microphone, touch screen, and one or more output devices 101, for example, a printing device, display screen, speaker. In addition, computer system 100 may contain one or more interfaces (not shown) that connect computer system 100 to a communication network (in addition or as an alternative to the interconnection mechanism 105.

Figure 2:
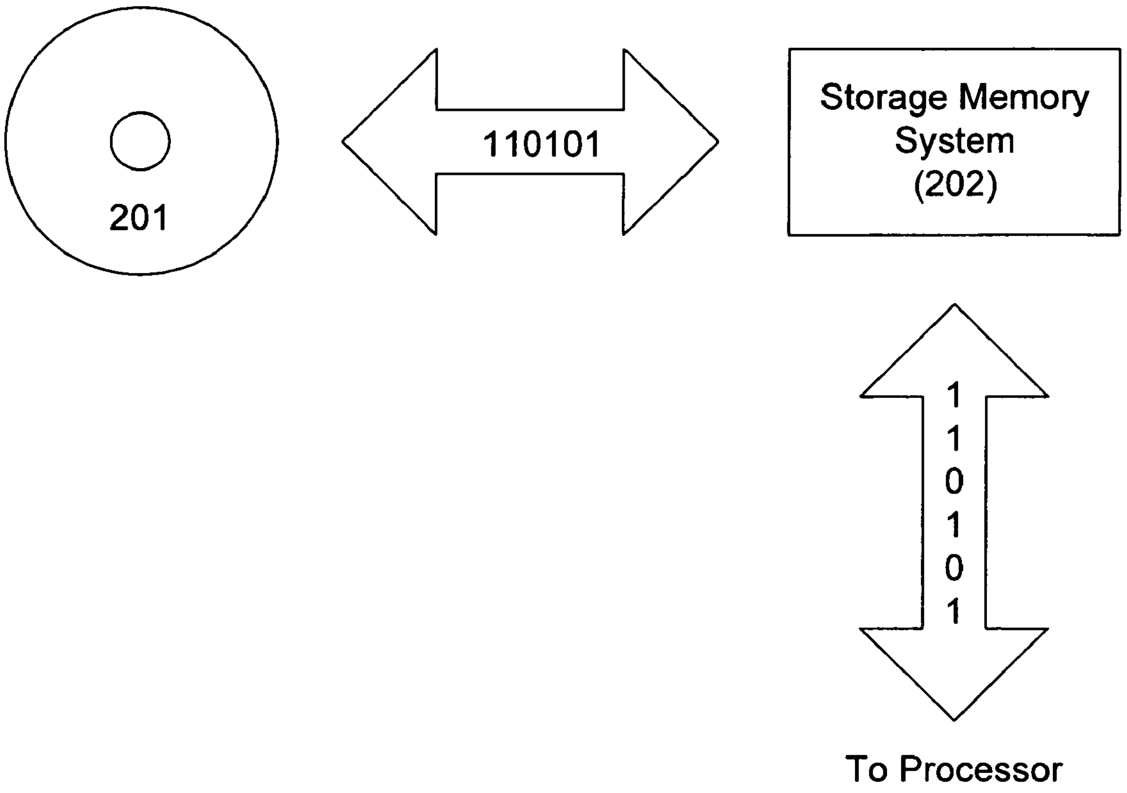
FIG. 2 is a block diagram of a computer data storage system with which various embodiments of the present invention may be practiced.

The storage system 106, shown in greater detail in FIG. 2, typically includes a computer readable and writeable nonvolatile recording medium 201 in which signals are stored that define a program to be executed by the processor or information stored on or in the medium 201 to be processed by the program. The medium may, for example, be a disk or flash memory. Typically, in operation, the processor causes data to be read from the nonvolatile recording medium 201 into another memory 202 that allows for faster access to the information by the processor than does the medium 201. This memory 202 is typically a volatile, random access memory such as a dynamic random access memory (DRAM) or static memory (SRAM). It may be located in storage system 106, as shown, or in memory system 104, not shown. The processor 103 generally manipulates the data within the integrated circuit memory 104, 202 and then copies the data to the medium 201 after processing is completed. A variety of mechanisms are known for managing data movement between the medium 201 and the integrated circuit memory element 104, 202, and the invention is not limited thereto. The invention is not limited to a particular memory system 104 or storage system 106.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 100 is shown by way of example as one type of computer system upon which various aspects of the invention may be practiced, it should be appreciated that aspects of the invention are not limited to being implemented on the computer system as shown in FIG. 1. Various aspects of the invention may be practiced on one or more computers having a different architecture or components that that shown in FIG. 1.

Computer system 100 may be a general-purpose computer system that is programmable using a high-level computer programming language. Computer system 100 may be also implemented using specially programmed, special purpose hardware. In computer system 100, processor 103 is typically a commercially available processor such as the well-known Pentium class processor available from the Intel Corporation. Many other processors are available. Such a processor usually executes an operating system which may be, for example, the Windows 95, Windows 98, Windows NT, Windows 2000 (Windows ME) or Windows XP operating systems available from the Microsoft Corporation, MAC OS System X available from Apple Computer, the Solaris Operating System available from Sun Microsystems, or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives.

Acts, elements and features discussed only in connection with one embodiment are not intended to be excluded from a similar role in other embodiments. Further, for the one or more means-plus-function limitations recited in the following claims, the means are not intended to be limited to the means disclosed herein for performing the recited function, but are intended to cover in scope any means, known now or later developed, for performing the recited function.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, shall be closed or semi-closed transitional phrases, as set forth, with respect to claims, in the United States Patent Office Manual of Patent Examining Procedures (Original Eighth Edition, August 2001), Section 2111.03.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of conducting a game comprising a plurality of game sessions, the method comprising acts of:

providing for an entry of a player and a plurality of other players in the plurality of game sessions through an interface of one or more computer systems;

prior to play by the player of the plurality of game sessions, accepting payment of a single entry fee through a payment component of a computer system to provide the player access to the plurality of game sessions;

providing the player with an option of paying a bet protection fee through a payment component of a computer-based bet protection system for the plurality of game sessions, the bet protection fee being separate from the single entry fee;

determining a standing of the player in the game relative to standings of the plurality of other players in the game on a controller of the computer-based bet protection system; and determining, on the controller of the computer-based bet protection system, whether the determined standing meets a predetermined standing, and, if not, refunding at least a portion of the single entry fee if the player had paid the bet protection fee.

2. The method according to claim 1, wherein the act of providing an entry includes an act of entering the player in a plurality of game sessions of blackjack.

3. The method according to claim 2, wherein the predetermined standing comprises accruing a minimum number of points.

4. The method of claim 1, further comprising an act of receiving the single entry fee from the player before the player plays the plurality of game sessions of a blackjack game.

5. The method according to claim 1, wherein the bet protection fee is accepted by a gaming operator.

6. The method according to claim 5, further comprising an act of eliminating a player from the plurality of gaming sessions if the player does not meet the predetermined standing.

7. The method according to claim 5, further comprising permitting the player to continue play in the plurality of game sessions if the player meets the predetermined standing.

8. The method according to claim 1, wherein the player meets the predetermined standing at a midpoint of the plurality of game sessions; and wherein if it is determined that the player does meet the predetermined standing, the bet protection fee is not refunded to the player.

9. The method according to claim 1, further comprising retaining the bet protection fee if the player meets the predetermined standing.

10. The method according to claim 1, further comprising retaining the single entry fee if the player chooses not to pay the bet protection fee, and the player does not achieve a winning standing in the plurality of game sessions.

11. The method according to claim 1, further comprising an act of providing for an entry of the player in at least one game session using an alternative method of entry (AMOE).

12. The method according to claim 11, wherein the AMOE is performed by at least one of a mail entry or through the Internet.

13. The method according to claim 1, further comprising an act of permitting the player to continue play when the player does not meet the predetermined standing and the player did not pay the bet protection fee.

14. The method of claim 1, wherein the act of determining a standing of the player in the game is based, at least in part, on performance in at least a portion of the plurality of game sessions.

15. The method of claim 1, further comprising paying to the player any winnings in addition to the refunded portion of the single entry fee.

16. The method according to claim 1, wherein the bet protection fee is accepted with the single entry fee.

17. The method according to claim 1, wherein the plurality of game sessions comprise sessions of at least one multiplayer game.

18. The method according to claim 17, wherein determining the standing of the player comprises determining a rank of the player in the at least one multiplayer game.

19. A system for conducting a plurality of game sessions, the system comprising:

an interface that receives from a player an entry to the plurality of game sessions;

a payment component configured to accept a single entry fee to provide the player access to the plurality of game sessions prior to play by the player in the plurality of game sessions, configured to accept entry fees from a plurality of other players to provide the plurality of other players access to the plurality of game sessions prior to play by the plurality of other players in the plurality of game sessions, configured to accept a bet protection fee associated with the plurality of game sessions, the bet protection fee being separate from the single entry fee; and configured to refund at least a portion of the single entry fee when so instructed by a controller if the player had paid the bet protection fee and if the player is determined to not meet a predetermined standing in the plurality of game sessions relative to standings of the plurality of other players of the plurality of game sessions at a predetermined time.

20. The system according to claim 19, wherein the controller is adapted to determine the standing of the player in the plurality of game sessions.

21. The system according to claim 20, wherein the controller is further adapted to conduct the plurality of game sessions.

22. The system according to claim 20, further comprising means for storing a predetermined standing, and wherein the controller is configured to compare the determined standing and the predetermined standing.

23. The system according to claim 22, wherein the controller is further configured to eliminate the player from playing in the plurality of game sessions if the player does not meet the predetermined standing.

24. The system according to claim 22, wherein the controller is further configured to instruct the payment component to refund at least a portion of the single entry fee if the player does not meet the predetermined standing.

25. The system of claim 20, wherein the plurality of game sessions comprise sessions of at least one multiplayer game.

26. The system of claim 25, wherein the controller is further adapted to determine the standing of the player by determining a rank of the player in the at least one multiplayer game.

27. The system according to claim 19, wherein the payment component is configured to provide payment to an external payment system.

28. The system according to claim 19, wherein the payment component is located in a legal gambling jurisdiction.

29. The system according to claim 19, further comprising means for entering the player in at least one game session using an alternative method of entry (AMOE).

30. The system according to claim 29, further comprising means for entering the player using AMOE by at least one of a mail entry or through the Internet.

31. The system according to claim 19, wherein the bet protection fee associated with the plurality of game sessions entitles the user to a refund of a portion of the single entry fee in response to the user not meeting a predetermined standing.

32. The system of claim 19, wherein the plurality of game sessions comprise sessions of at least one multiplayer game.

33. A system for conducting a plurality of game sessions, the system comprising:

an interface that receives from a player an entry to a plurality of game sessions;

a payment component configured to accept a single entry fee to provide the player access to the plurality of game sessions prior to play by the player in the plurality of games sessions, configured to accept entry fees from a plurality of other players to provide the plurality of other players access to the plurality of game sessions prior to play by the plurality of other players in the plurality of game sessions, and configured to provide the player with an option of paying a bet protection fee for the plurality of game sessions, the bet protection fee being separate from the single entry fee;

a controller configured to determine a standing of the player in the plurality of game sessions relative to standings of the plurality of other players, and configured to compare the determined standing to a predetermined standing; and wherein the payment component is further configured to refund at least a portion of the single entry fee when the comparison indicates that the player does not meet the predetermined standing and the player had paid the bet protection fee.

34. The system according to claim 33, wherein the controller is further configured to eliminate the player from the plurality of game sessions when at least a portion of the single entry fee is refunded.

35. The system according to claim 33, wherein the controller is further configured to permit the player to continue playing the plurality of game sessions when the player does not meet the predetermined standing and the player has not paid the bet protection fee.

36. The system according to claim 33, wherein the interface is configured to permit an entry from a player in at least one game session using an alternative method of entry (AMOE).

37. The system according to claim 33, wherein the plurality of game sessions comprise sessions of at least one multiplayer game.

38. The system according to claim 37, wherein the controller is further configured to determine the standing of the player by determining a rank of the player in the at least one multiplayer game.

39. A method of conducting a game comprising a plurality of game sessions, the method comprising acts of:

providing for an entry of a player and a plurality of other players in the plurality of game sessions through an interface of one or more computer systems;

prior to play by the player of the plurality of game sessions, accepting payment of a single subscription fee through a payment component of a computer system to provide the player access to the plurality of game sessions;

providing the player with an option of paying a bet protection fee through a payment component of a computer-based bet protection system for the plurality of game sessions, the bet protection fee being separate from the subscription fee;

determining a standing of the player in the game relative to standings of the plurality of other players on a controller of the computer-based bet protection system; and contingent on the player not achieving a pre-determined standing at a pre-determined point during game session play, refunding the subscription fee and, through the controller of the computer-based bet protection system, eliminating the player from playing in one or more remaining game sessions if the player paid the bet protection fee, and permitting the player to continue to play in one or more game sessions if the player did not pay the bet protection fee.

* * * * *